(12) United States Patent
Nakamura

(10) Patent No.: US 7,212,840 B2
(45) Date of Patent: May 1, 2007

(54) CELLULAR PHONE AND INCOMING CALL RECEPTION INFORMING METHOD

(75) Inventor: Taisuke Nakamura, Saitama (JP)

(73) Assignee: NEC Corporation (JP)

( * ) Notice: Subject to any disclaimer, the term of this patent is extended or adjusted under 35 U.S.C. 154(b) by 343 days.

(21) Appl. No.: 10/859,555

(22) Filed: Jun. 3, 2004

(65) Prior Publication Data

US 2004/0253993 A1 Dec. 16, 2004

(30) Foreign Application Priority Data

Jun. 11, 2003 (JP) .............................. 2003-166964

(51) Int. Cl.
*H04B 1/38* (2006.01)
*H04M 1/00* (2006.01)

(52) U.S. Cl. .................. 455/567; 455/414.1; 455/267; 379/373.01; 379/375.01; 379/418

(58) Field of Classification Search ............ 455/414.1, 455/267, 458, 575.1, 422.1, 435.1, 566, 567; 379/373.01, 375.01, 386, 418
See application file for complete search history.

(56) References Cited

U.S. PATENT DOCUMENTS 5,452,354 A * 9/1995 Kyronlahti et al. .... 379/373.02
6,675,026 B2 * 1/2004 Yoon .......................... 455/567
6,934,377 B2 * 8/2005 Bezner et al. ......... 379/212.01
2002/0052224 A1 * 5/2002 Yoon .......................... 455/567
2003/0027605 A1 * 2/2003 Hijii .......................... 455/567
2004/0032946 A1 * 2/2004 Koser et al. ........... 379/373.01

FOREIGN PATENT DOCUMENTS

| JP | 2000-354087 | 12/2000 |
| JP | 2002-57746  | 2/2002  |
| JP | 2002-204286 | 7/2002  |

* cited by examiner

*Primary Examiner*—Congvan Tran
*Assistant Examiner*—Huy D Ngueyn
(74) *Attorney, Agent, or Firm*—Dickstein, Shapiro, LLP.

(57) ABSTRACT

Incoming call tones and program numbers as numbers used to specify respective incoming call tones are stored in a memory of a cellular phone so as to be set in correspondence to each other. The program numbers are used to specify corresponding incoming call tone melodies, data of which is stored in the memory. A control circuit of the cellular phone, whenever an incoming call is received, increments a value of a counter indicating the corresponding program number by one, and uses an incoming call tone corresponding to the program number corresponding to the value of the counter.

10 Claims, 6 Drawing Sheets

| MELODY REGISTRATION NUMBER | MELODY NAME | PROGRAM NUMBER |
|---|---|---|
| 1 | MELODY A | 4 |
| 2 | MELODY B | 1 |
| 3 | MELODY C | 0 |
| 4 | MELODY D | 2 |
| 5 | MELODY E | 3 |
| 6 | MELODY F | 0 |
| 7 | MELODY G | 0 |
| 8 | MELODY H | 5 |

| INCOMING CALL RECEPTION EVENT | INCOMING CALL TONE | |
|---|---|---|
| | MELODY NAME | PROGRAM NUMBER |
| FIRST TIME | MELODY B | 1 |
| SECOND TIME | MELODY D | 2 |
| THIRD TIME | MELODY E | 3 |
| FOURTH TIME | MELODY A | 4 |
| FIFTH TIME | MELODY H | 5 |
| SIXTH TIME | MELODY B | 1 |
| SEVENTH TIME | MELODY D | 2 |
| ⋮ | ⋮ | ⋮ |

FIG. 5

| MELODY REGISTRATION NUMBER | MELODY NAME | PROGRAM NUMBER | WEIGHT |
|---|---|---|---|
| 1 | MELODY A | 4 | 1 |
| 2 | MELODY B | 1 | 1 |
| 3 | MELODY C | 0 | 0 |
| 4 | MELODY D | 2 | 3 |
| 5 | MELODY E | 3 | 2 |
| 6 | MELODY F | 0 | 0 |
| 7 | MELODY G | 0 | 0 |
| 8 | MELODY H | 5 | 1 |

CELLULAR PHONE AND INCOMING CALL RECEPTION INFORMING METHOD

BACKGROUND OF THE INVENTION

1. Field of the Invention

The present invention relates in general to a cellular phone, and more particularly to a cellular phone having a function of, when an incoming call is received, generating an incoming call tone to inform a user of reception of the incoming call.

2. Description of the Related Art

In recent years, a user possessing a cellular phone sets an incoming call tone for, when an incoming voice call is received, or when an E-mail call is received, informing the user of reception of the incoming call according to user's own preferences. The incoming call tone thus set is an incoming call tone, the data of which is stored in a cellular phone in advance when the cellular phone is purchased.

In addition, the set incoming call tone is an incoming call tone, the data of which is downloaded by a user from a server of an enterprise providing a service for delivering incoming call tones to be stored in a cellular phone. Moreover, such a set incoming call tone is an original incoming call tone data of which is created by a user to be stored in a cellular phone.

A user may set one incoming call tone (e.g., incoming call tone melody) signaling reception of an incoming voice call and another one signaling reception of an incoming E-mail call in some cases.

Even when a large number of kinds of data of incoming call tone melodies are stored in a cellular phone, only one incoming call tone melody can be used at a time by a user. Thus, when a user desires to generate multiple kinds of incoming call tone melodies to take pleasure in them, the user needs to manipulate the cellular phone to change the setting of an incoming call tone melody. When a user does not change the setting of the incoming call melody tone since a user feels that an operation for changing of the setting of the incoming call melody tone is troublesome, the cellular phone generates the same incoming call melody tone at every reception of an incoming call. Consequently, a user can not take pleasure in multiple kinds of incoming call melody tones.

Then, a system is proposed for selecting at random an incoming call tone melody which is to ring when an incoming call is received (refer to JP 2002-204286 A for example).

In addition, there is a cellular phone in which data of a single incoming call melody tone is divided into a plurality of parts data of which is in turn stored in the form of division data. This cellular phone, when ever an incoming call is received, rings different incoming call melody tone obtained from the division data (refer to JP 2000-354087 A for example).

However, in the system described-in JP 2002-204286 A, an incoming call melody tone ringing when an incoming call is received is selected at random in correspondence to an instantaneous value of a program counter of a microcomputer in the system. Hence, a specific incoming call melody tone may not be selected for a long period of time in some cases. Also, there is a possibility that an incoming call tone melody which, though its data is stored in the cellular phone, is not desired to be used as an incoming call tone melody may be selected.

In addition, the method described in JP 2000-354087 A does not cope with use of a plurality of kinds of incoming call tone melodies. For this reason, in a case where a user desires to use another incoming call tone melody, the user needs to divide data of another incoming call tone melody into a plurality of parts and to set an incoming call tone. For this reason, a user must carry out a complicated manipulation.

SUMMARY OF THE INVENTION

The object of the present invention is to solve the above-mentioned problems and provide a cellular phone with which any one of a plurality of incoming call tones which a user likes can be automatically selected, and a situation can be avoided in which a specific incoming call tone is not selected for a long period of time.

An incoming call reception informing method for a cellular phone according to the present invention includes a function of generating, when an incoming call is received, an incoming call tone to inform a user of reception of the incoming call. The method has a feature in that one incoming call tone data is selected among a plurality of kinds of incoming call tone data in accordance with predetermined order whenever an incoming call is received.

A cellular phone according to the present invention includes a function of generating, when an incoming call is received, an incoming call tone to inform a user of reception of the incoming call, and is provided with: a memory for storing therein a plurality of kinds of incoming call tone data; and a control circuit for selecting, whenever an incoming call is received, one incoming call tone data among a plurality of kinds of incoming call tone data stored in the memory in accordance with predetermined order.

BRIEF DESCRIPTION OF THE DRAWINGS

These and other objects, features and advantages of the invention will become more fully apparent from the following detailed description taken in conjunction with accompanying drawings. In the drawings:

FIG. 5 is an explanatory diagram showing the order of incoming call tones to be output;

DETAILED DESCRIPTION OF THE EMBODIMENTS

Hereinafter, each embodiment of the present invention will be described in detail with reference to the drawings.

Next, preferred embodiments of the present invention will hereinafter be described in detail with reference to the accompanying drawings.

Figure 1:
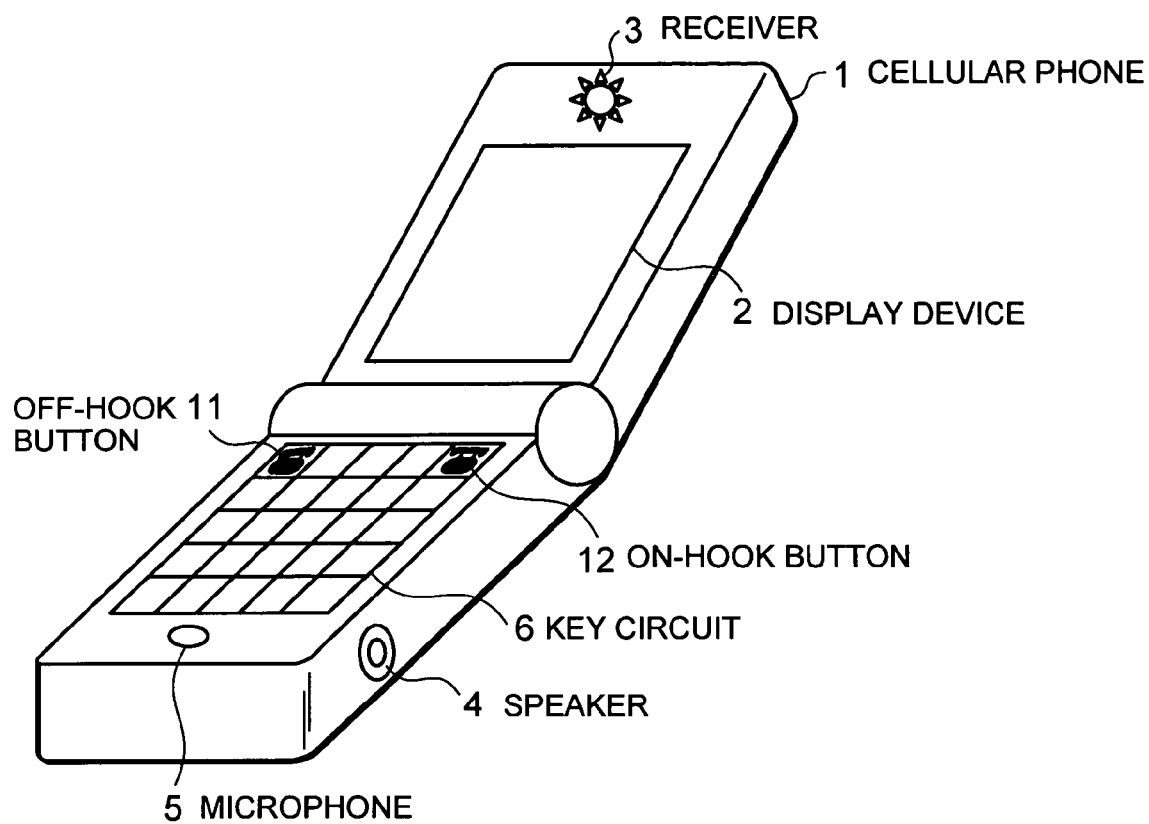
FIG. 1 is a perspective view showing an example of an exterior appearance of a cellular phone according to the present invention.

FIG. 1 is a perspective view showing an example of an exterior appearance of a cellular phone of the present invention. A cellular phone 1 according to the present invention includes a display device 2 for displaying thereon information, a receiver 3 for outputting a voice of the other party of a call during a voice call, and a speaker 4 for outputting an incoming call tone or the like. Moreover, the cellular phone 1 includes a microphone 5 for converting a voice of a user during a call into an audio signal, and a key circuit 6 through which a user inputs a telephone number of a destination, information of an E-mail call to be transmitted, or set information to be inputted in the cellular phone 1.

In addition, the key circuit 6 includes an OFF-hook button 11 which a user depresses when a user instructs the origination after input of a telephone number of a destination of an outgoing call, and when the user instructs the reception of an incoming call when there is reception of an incoming call, and an ON-hook button 12 which a user depresses when a voice call is ended for the cellular phone 1.

Figures 2, 3:
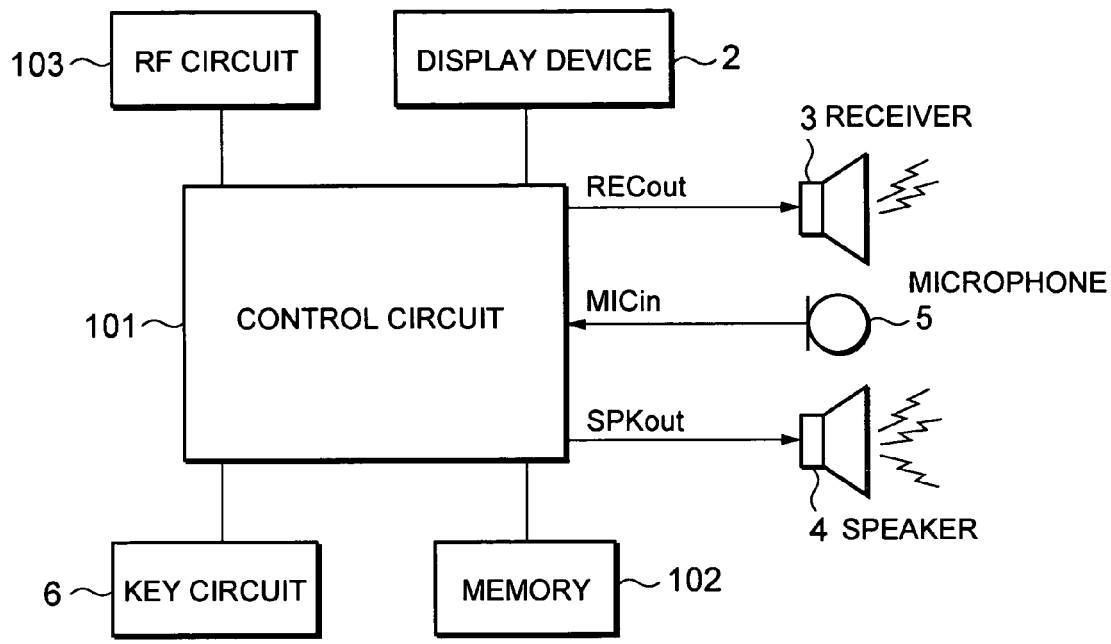
FIG. 2 is a block diagram showing an example of an internal configuration of the cellular phone according to the present invention.
FIG. 3 is an explanatory diagram showing an example of program melody selection information.

FIG. 2 is a block diagram showing an example of an internal configuration of the cellular phone of the present invention.

A control circuit 101 includes a central processing unit (CPU) and an input-output circuit to control the units of the cellular phone 1. An RF circuit 103 transmits an audio signal, information necessary for communication, and the like on a carrier wave to a radio base station of a cellular phone communication network in accordance with control made by the control circuit 101. Also, the RF circuit 103 receives an audio signal, information necessary for communication, and the like from the radio base station. A memory 102 as storage means stores therein data of outgoing call history, incoming call reception history, the number of times of reception of incoming calls, and melodies.

In addition, the control circuit 101 controls the display device 2, the receiver 3, the speaker 4 and the microphone 5, and controls an input operation for the key circuit 6.

An internal counter (not shown) is provided inside the control circuit 101. The internal counter is initialized to 0 or 1 by the control circuit 101, and is then up-counted. The memory 102 stores therein data of incoming call tone melodies, and program melody selection information (table for program melody selection) as shown in FIG. 3.

FIG. 3 is an explanatory diagram showing an example of the program melody selection information.

The program melody selection information is provided in the form of a table in which melody names corresponding to the data of incoming, call tone melodies (incoming call tone data) stored in the memory 102, melody registration numbers and program numbers are set in correspondence to each other. The melody registration numbers are serial numbers which are given in the order of registration of melodies. The program numbers are numbers indicating the order of output of the corresponding incoming call tone melodies, and are serial numbers beginning with 1, or 0.

Since a value "C" of the internal counter corresponds to the program number, the internal counter is used to specify the data of the incoming call tone melody stored in the memory 102. Since the value C of the internal counter is incremented at every reception of an incoming call, the program number is incremented accordingly.

In the example shown in FIG. 3, for example, the data of a melody "A" having "1" as a melody registration number is stored so as to be set in correspondence to a program number "4". In addition, the data of a melody "B" having "2" as a melody registration number is stored so as to be set in correspondence to a program number "1". In a case where the setting is made for incoming call tone output based on the program melody selection information, the control circuit 101 outputs the incoming call tone melodies corresponding to the program numbers each not being 0 in order of the program numbers, i.e., in the order of the contents of the internal counter.

In addition, the incoming call tone melodies corresponding to the program numbers each being 0 are not outputted. Consequently, the program number contains therein information indicating the incoming call tone data to be used and information indicating the incoming call tone data not to be used (having 0 set therein).

When a user makes a request to set a program number through the key circuit 6, the control circuit 101 makes the display device 2 to display thereon a screen for program number setting. The melody registration numbers, the melody names and the program numbers as exemplified in FIG. 3 are displayed in the form of a list on the screen for program number setting. While the screen for program number setting is displayed on the display device 2, a user can change a melody name and a program number. For example, a cursor is moved to a position where the information desired to be changed is displayed by carrying out the key operation for the key circuit 6 to key the information after the change. The control circuit 101 changes the contents of the memory 102 in accordance with the keying made by a user. As described above, the control circuit 101 sets the information used to specify the order of the program numbers in the table for program melody selection in accordance with the information inputted through the input operation for the key circuit 6 made by a user.

Note that when a program number not being 0 is changed into 0 so that a missing number occurs in the serial numbers, the control circuit 101 renumbers the program numbers so that the program numbers not being 0 become the serial numbers. On the other hand, when a program number being 0 is changed into a program number not being 0 so that duplication occurs in the numbers, the control circuit 101 renumbers the program numbers so that the program numbers not being 0 become the serial numbers. Then, after a user completes an operation for program number setting, the control circuit 101 stores a maximum value of the program numbers as a maximum value "Cmax" of the program number in the memory 102. Moreover, when the setting of the program numbers is firstly made, the control circuit 101 sets the value of the internal counter to 0.

In addition, to store the data of an incoming call tone melody newly in the memory 102, a user carries out an operation for additional registration of the new incoming call tone melody through the key circuit 6. At this time, the control circuit 101, for example, makes the display device 2 to display thereon a number next to a maximum number of the melody registration numbers already registered in the program melody selection information and also makes the display device 2 to display thereon a screen for urging a user to input a melody name.

When the user inputs a melody name through the key circuit 6, the control circuit 101 registers the newly inputted melody name in the program melody selection information so as to set the newly inputted melody name in correspondence to a melody registration number of a number next to the maximum number of the melody registration numbers already registered.

The control circuit 101 sets a program number corresponding to the newly registered melody registration number to zero. Since this program number is zero, this newly registered incoming call tone melody is not outputted. Thus, when this incoming call tone melody is intended to be outputted, it is necessary to change this program number from zero.

Note that the data of the incoming call tone melodies is inputted by operating the key circuit 6 by a user. Or, the incoming call tone melody data is downloaded from a server of a provider providing a service for delivering incoming call tone melodies to be stored in the memory 102 by the control circuit 101. Alternatively, a manufacturer of the cellular phone 1 may store the data of melodies in the memory 102 in advance. In the first embodiment, a program number of a newly registered melody is kept at zero unless an operation for the program number setting is carried out.

A user can carry out the setting related to whether or not the incoming call tone is outputted based on the program melody selection information. The setting information related to whether or not the incoming call tone is outputted based on the program melody selection information is stored in the memory 102 in accordance with the setting made by the user. In a case where the setting is made in which the incoming call tone output based on the program melody selection information is carried out, the value of 1 is added to the value of the internal counter whenever an incoming call is received to increment the internal counter.

Then, the control circuit 101 reads out the melody data having the program number agreeing with the value of the internal counter to convert the read-out melody data into an audio signal. The audio signal is then outputted through the speaker 4. For example, in the example shown in FIG. 3, when the value C of the internal counter is 2, a melody set in correspondence to the program number "2" is the melody D. Hence, in this case, the melody D is outputted through the speaker 4.

But, when a relationship of (the value C of the internal counter)>(the maximum value Cmax of the program number) is obtained, the control circuit 101 sets the value C of the internal counter to 1 to output the melody B set in correspondence to the program number "1" to the speaker 4.

In addition, in a case where the setting is made in which the incoming call tone output based on the program melody selection information is not carried out, the control circuit 101 outputs the pre-specified incoming call tone to the speaker 4. A user can select any one of the data of the incoming call tone melodies stored in the memory 102 as a specific incoming call tone in advance.

Note that the specification of the incoming call tone is carried out by selecting the incoming call tone data of which rank in a predetermined order is used. This specification is realized by specifying the program number on the basis of the value of the internal counter by the control circuit 101. The selected incoming call tone data is read out from the memory 102 to be outputted to the speaker 4. That is to say, the function of determining the incoming call tone melody corresponding to the specified program number is carried out by the control circuit 101.

Figure 4:
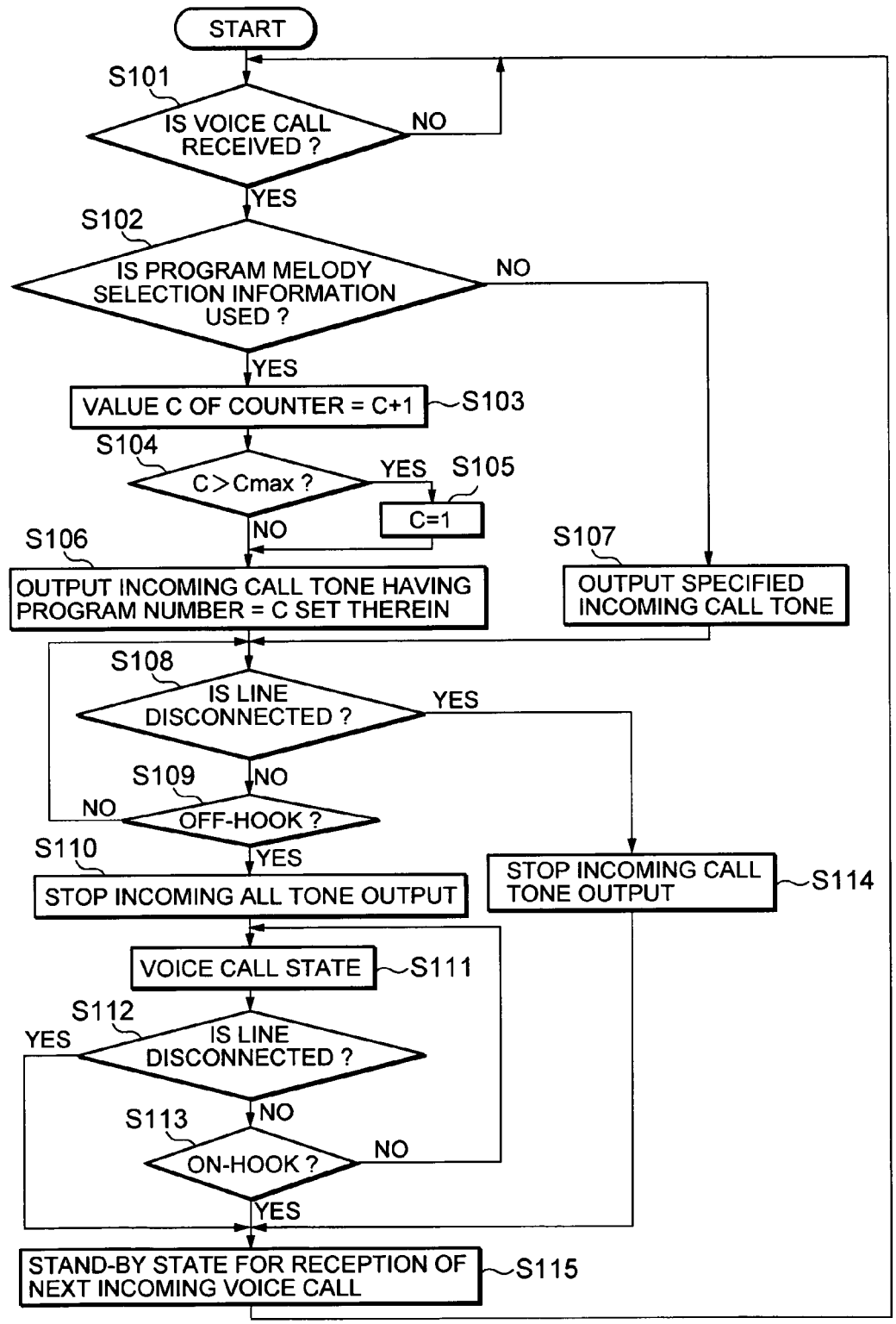
FIG. 4 is a flow chart explaining an operation of a cellular phone according to a first embodiment of the present invention.

Next, an operation of the cellular phone 1 according to the first embodiment of the present invention will hereinafter be described in detail. FIG. 4 is a flow chart explaining an operation of the cellular phone 1 according to the first embodiment of the present invention.

Here, a description will now be given by taking notice of a voice call with reference to FIGS. 1 to 4.

Upon turn-ON of a power supply of the cellular phone 1, the control circuit 101 becomes a stand-by state. In the stand-by state, the control circuit 101 monitors whether or not the cellular phone 1 receives a voice call (incoming voice call) from the radio base station of the cellular phone communication network through the RF circuit 103 (Step S101). Upon detection of the voice call from the radio base station through the RF circuit 103, the control circuit 101 verifies whether or not the setting for the incoming call tone output is made using the program melody selection information. If it is verified that the setting for the incoming call tone output is made using the program melody selection information, then the value of 1 is added to the value C of the internal counter stored in the memory 102 (Steps S102 and S103).

The control circuit 101 compares the value C of the internal counter with the maximum value Cmax of the program number. When a relationship of C>Cmax is obtained, the control circuit 101 sets the value C of the internal counter to 1 (Steps S104 and S105).

The control circuit 101 verifies the program melody selection information stored in the memory 102 to recognize the program number having the same value as the value C of the internal counter. Then, the control circuit 101 specifies the incoming call tone melody corresponding to the recognized program number. In the example shown in FIG. 3, when the value C of the internal counter is 1, the melody name corresponding to the program number "1" is the melody "B", and hence the incoming call tone melody corresponding to the melody B is specified. Then, the control circuit 101 reads out the data of the specified incoming call tone melody from the memory 102 to convert the read-out data into an audio signal. The resultant audio signal is then outputted to the speaker 4. The speaker 4 outputs the inputted audio signal corresponding to the incoming call tone melody B in the form of an incoming call tone (Step S106). As described above, the value C of the internal counter agrees with the program number.

On the other hand, if it is verified that the setting for the incoming call tone output is not made using the program melody selection information, then the control circuit 101 reads out the data of the pre-specified incoming call tone to convert the read-out data into an audio signal. The resultant audio signal is then outputted to the speaker 4. Thereafter, the specified incoming call tone is outputted through the speaker 4 (Step S107)

When a line is disconnected before a user depresses the OFF-hook button 11, the control circuit 101 stops the output of the incoming call tone melody to proceed to the stand-by state (Steps S108, S114 and S115). On the other hand, when the line is not disconnected and a user depresses the OFF-hook button 11, the control circuit 101 stops the output of the incoming call tone melody to proceed to a voice call state (Steps S108 to S111). In the voice call state, the control circuit 101 makes the receiver 3 to output the audio signal obtained from the incoming voice call from the other party of a call.

In addition, a voice of a user is inputted to the microphone 5 to be converted into an audio signal. The resultant audio signal is then outputted to the radio base station through the RF circuit 103.

Next, at the time when a source disconnects the line, or a user depresses the ON-hook button 12, the control circuit 101 ends the voice call state (Steps S112 and S113). Upon end of the voice call state, the cellular phone 1 becomes a stand-by state for reception of a next incoming call. That is to say, the control circuit 101 is returned back to the stand-by state in which the cellular phone 1 monitors whether or not a call is made from the radio base station of the cellular phone communication network through the RF circuit 103 (Steps S115 and S101).

When a second incoming voice call is received (reception of a voice call), in Step S106, the value C of the internal counter is incremented up to 2. Thus, the control circuit 101 outputs the melody set in correspondence to the program number "2" through the speaker 4. In the example shown in FIG. 3, a melody set in correspondence to the program number "2" is the melody D. Hence, the melody D is outputted through the speaker 4.

Similarly, when a third incoming voice call is received, the value C of the internal counter is incremented up to 3. Thus, the melody E set in correspondence to the program number "3" is outputted through the speaker 4. When a fourth incoming voice call is received, the value C of the internal counter is incremented up to 4. Thus, the melody A set in correspondence to the program number "4" is outputted through the speaker 4. Similarly, when a fifth incoming voice call is received, the value C of the internal counter is incremented up to 5. Thus, the melody H set in correspondence to the program number "5" is outputted through the speaker 4.

Then, when a sixth incoming voice call is received, a relationship of the value C of the internal counter=6>Cmax=5 is obtained, therefore the processing proceeds to Steps S104 and S105, and thus, the value C of the internal counter becomes 1. Since in Step S106, the value C of the internal counter is 1, the control circuit 101 outputs the melody B set in correspondence to the program number "1" through the speaker 4.

FIG. 5 is an explanatory diagram showing the order of the outputted incoming call tones.

Thus, whenever an incoming voice call is received, the incoming call tone melody is outputted so as to follow the order shown in FIG. 5 through the speaker 4. That is to say, the value C of the internal counter is incremented at every event of reception of an incoming voice call, and the melodies set in correspondence to program numbers agreeing with the values C of the internal counter will be outputted in order.

As described above, according to the first embodiment, the incoming call tone melody for informing a user of reception of an incoming voice call is selected among a plurality of incoming call tone melodies which the user has selected. In addition, the value C of the internal counter is incremented whenever an incoming voice call is received, and the incoming call tone melodies are selected in the order of the program numbers corresponding to the respective values C of the internal counter in order. Consequently, if there is reception of incoming voice calls corresponding to the predetermined number of times (five times in this embodiment), then a plurality of incoming call tone melodies which a user likes are used in order without omission.

The above-mentioned first embodiment is an embodiment which is implemented by focusing on the voice call. A second embodiment which will next be described is an embodiment which is implemented by focusing on reception of an E-mail call. An internal configuration of a cellular phone according to the second embodiment is the same as that shown in FIG. 2 except that the control circuit 101 has necessarily a timer (not shown).

An operation of the cellular phone according to the second embodiment will hereinafter be described in detail.

Figure 6:
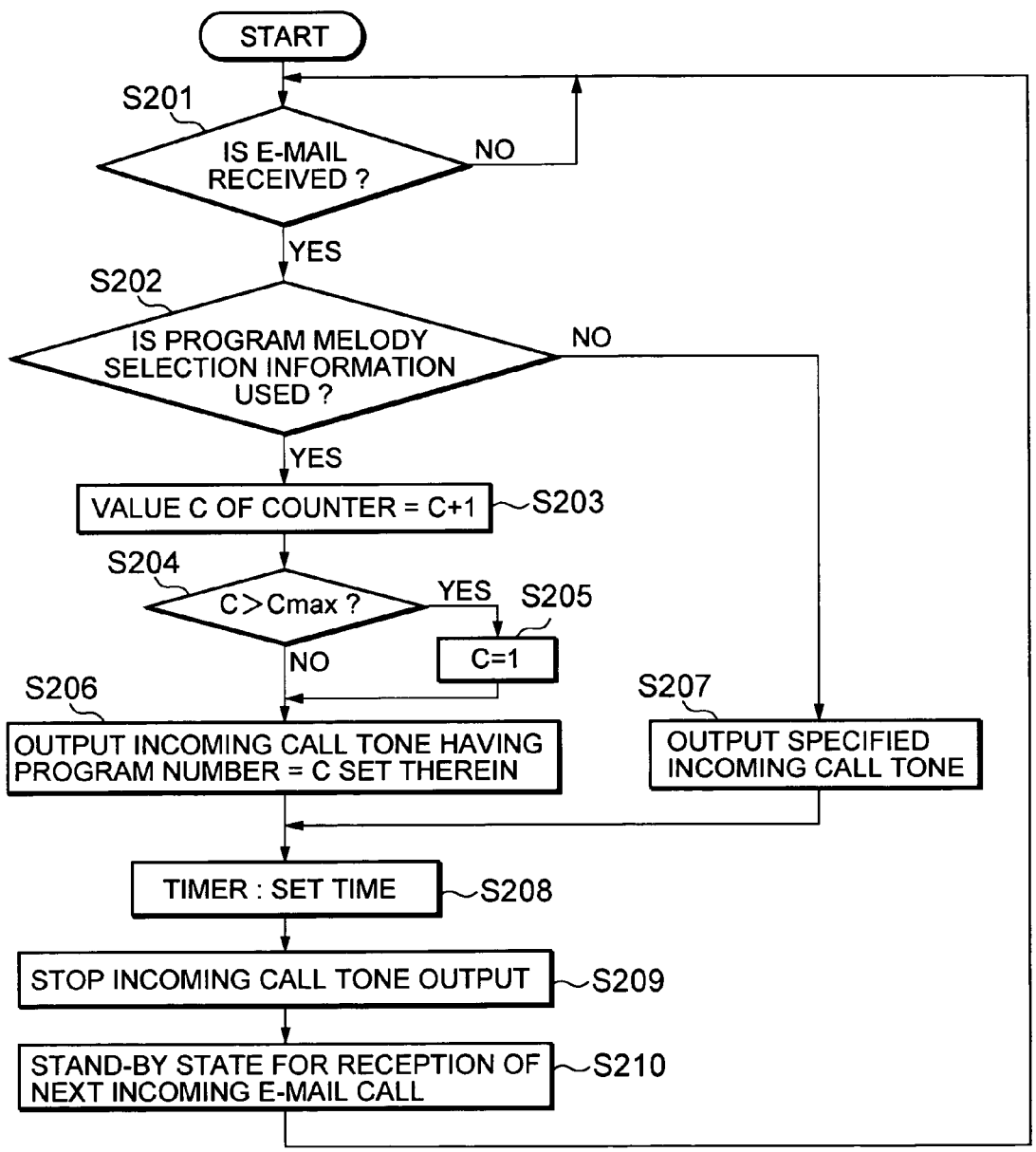
FIG. 6 is a flow chart explaining an operation of a cellular phone according to a second embodiment of the present invention.

FIG. 6 is a flow chart explaining the operation of the cellular phone according to the second embodiment of the present invention.

Upon turn-ON of the power supply of the cellular phone 1, the control circuit 101 becomes the stand-by state. In the stand-by state, the control circuit 101 monitors whether or not the cellular phone 1 receives an E-mail call from the radio base station of the cellular phone communication network through the RF circuit 103 (Step S201). If the control circuit 101 detects that the cellular phone 1 receives an E-mail call from the radio base station of the cellular phone communication network through the RF circuit 103, then the control circuit 101 detects whether or not setting is made for incoming call tone output based on the program melody selection information. If the setting is made for incoming call tone output based on the program melody selection information, then the value of 1 is added to the value C of the internal counter stored in the memory 102 (Steps S202 and S203).

Next, the control circuit 101 compares the value C of the internal counter with the maximum value Cmax of the program number. If a relationship of C>Cmax is obtained, then the control circuit 101 set 1 to the value C of the internal counter (Steps S204 and S205).

The control circuit 101 retrieves the program melody selection information stored in the memory 102 to specify an incoming call tone melody corresponding to the program number having the same value as the value C of the internal counter as an incoming call tone melody to be outputted. Referring now to FIG. 3, since when the value C of the internal counter is 1, the program number corresponding to the melody B is 1, the melody B is specified as the incoming call tone melody. Then, the control circuit 101 reads out the data of the specified incoming call tone melody B from the memory 102 to convert the read-out data into an audio signal. The resultant audio signal is then outputted to the speaker 4. The speaker 4 outputs the audio signal outputted thereto in the form of an incoming call tone melody (Step S206). In addition, the control circuit 101, when the melody is started to be generated, makes the timer to start the measurement of time (Step S208).

On the other hand, if the setting is not made for incoming call tone output based on the program melody selection information, then the control circuit 101 reads out the data of the pre-specified incoming call tone melody to convert the read-out data into an audio signal. The resultant audio signal is then outputted to the speaker 4. The audio signal is outputted in the form of the pre-specified incoming call tone melody through the speaker 4 (Step S207). In addition, the control circuit 101, when the melody is started to be generated, makes the timer to start the measurement of time (Step S208).

At the time when an elapsed time measured with the timer reaches predetermined-duration of an incoming call tone, the control circuit 101 stops the output of the melody (Step S209). Note that a user can set the duration of the incoming call tone in advance.

The cellular phone 1, upon end of the output of the melody, becomes the stand-by state for reception of a next incoming call. The control circuit 101 monitors whether or not the cellular phone 1 receives an incoming call from the radio base station of the cellular phone communication network through the RF circuit 103 (Steps S210 and S201).

As described above, in the second embodiment, an incoming call tone melody for informing a user of reception of an E-mail call is selected among a plurality of incoming call tone melodies selected by a user. In addition, whenever an incoming E-mail call is received, the incoming call tone melody is selected in order of count-up of the value C of the internal counter. Consequently, if there is reception of incoming E-mail calls corresponding to the predetermined number of times (five times in this embodiment), then a plurality of incoming call tone melodies which a user likes are used in order without omission.

The first embodiment is an embodiment which is implemented by focusing on reception of a voice call, while the second embodiment is an embodiment which is implemented by focusing on reception of an E-mail call. Now, a cellular phone according to a third embodiment of the present invention which will next be described is a cellular phone having both the function of the cellular phone of the first embodiment and the function of the cellular phone of the second embodiment.

Figures 7, 8:
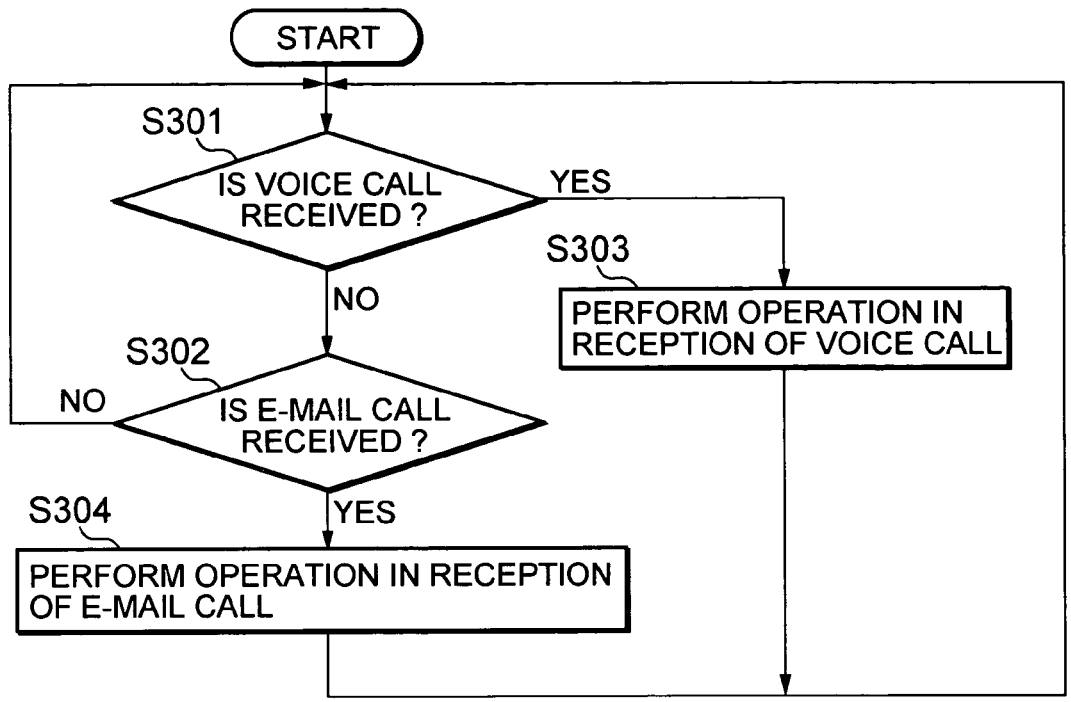
FIG. 7 is a flow chart explaining an operation of a cellular phone according to a third embodiment of the present invention.
FIG. 8 is an explanatory diagram showing an example of a structure of actable for program melody selection when incoming call melody tones are weighted.

An operation of the cellular phone according to the third embodiment of the present invention will hereinafter be described. FIG. 7 is a flow chart explaining the operation of the cellular phone according to the third embodiment of the present invention.

In a stand-by state for reception of a next incoming voice call or E-mail call, the control circuit 101 monitors whether the cellular phone 1 receives an incoming voice call or an E-mail call from the radio base station of the cellular phone communication network through the RF circuit 103 (Step S301 or S302).

At the time when detecting reception of an incoming voice call from the radio base station through the RF circuit 103, the control circuit 101 carries out an operation in reception of an incoming voice call (Step S303). The operation in reception of an incoming voice call in Step S303 is the same as that from Step S102 to Step S115 of FIG. 4 in the first embodiment.

On the other hand, at the time of detecting reception of an incoming E-mail call from the radio base station through the RF circuit 103, the control circuit 101 carries out an operation in reception of an incoming E-mail call (Step S304). The operation in reception of an incoming E-mail call is the same as that from Step S202 to Step S210 of FIG. 6 in the second embodiment.

Note that in the third embodiment, a program melody selecting table for reception of an incoming voice call and a program melody selecting table for reception of an incoming E-mail call are separately provided. In addition, with respect to the internal counter as well for specifying a program number, an internal counter for reception of an incoming voice call and an internal counter for reception of an incoming E-mail call are separately provided. Moreover, with respect to the maximum value Cmax as well of the program number, a maximum number for reception of an incoming voice call and a maximum number for reception of an incoming E-mail call are separately provided. In other words, the table which is used whenever an incoming voice call is received and the table which is used whenever an incoming E-mail call is received are separately stored in the memory 102. Thus, the control circuit 101 uses the table corresponding to a kind of a received incoming call.

According to the third embodiment, an incoming call tone melody for informing a user of reception of an incoming voice call and an incoming E-mail tone melody for informing a user of reception of an incoming E-mail call are selected among a plurality of incoming call tone melodies which were selected by a user, respectively. In addition, whenever an incoming voice call or an incoming E-mail call is received, the incoming call tone melody is selected so as to follow the order of count-up of the value C of the internal counter. Consequently, a plurality of incoming call tone melodies which a user likes are used in order without omission.

Next, a description will hereinafter be given with respect to a fourth embodiment in which an incoming call tone melody is newly registered.

When an incoming call tone melody is newly stored in the memory 102, the control circuit 101 gives a program number "1" to this melody. In addition, the control circuit 101 increases each program number not being 0 stored in the memory 102 by one. For example, the program number corresponding to a new incoming call tone melody becomes "1", and the program number of an incoming call tone number set in correspondence to the program number "1" until that time becomes "2".

Similarly, the program number of an incoming call tone number set in correspondence to the program number "2" becomes "3", and the program number of an incoming call tone number set in correspondence to the program number "3" becomes "4". Subsequently, the program number of each melody has a value which is obtained by adding 1 to the value of the program number given until that time. Then, the value of the internal counter is initialized to zero.

Thus, according to the fourth embodiment, since a program number of a new melody stored in the memory 102 is set to 1, this new melody is preferentially specified as an incoming call tone. For this reason, it is possible to easily verify that a new incoming call tone melody is surely registered.

In the above-mentioned first to fourth embodiments, the incoming call tone melodies corresponding to the program numbers each not being 0 are used in order one by one. In this case, the incoming call tone melodies may be weighted. Next, a description will hereinafter be given with respect to a fifth embodiment in which incoming call tone melodies are weighted.

FIG. 8 is an explanatory diagram showing an example of a structure of a table for program melody selection in a case where the incoming call tone melodies are weighted.

Here, a numeric value of the weight shown in FIG. 8 indicates the number of times related to how many times the same melody is continuously used for each reception of an incoming call. For example, since the melody D corresponding to the program number "2" is weighted with 3, the melody D is continuously used as the incoming call tone up to 3 times for reception of the incoming call. Also, since the melody A corresponding to the program number 4 is weighted with 1, after an incoming call is received once, the melody A is changed over to a next melody.

Referring now to FIG. 8, if an incoming call is received when the value C of the internal counter is 2, then a numeric value of the weight is 3, and therefore the incoming call tone melody D having the program number "2" is continuously used until the third reception on and after that reception of the incoming call (including that reception).

In addition, if an incoming call is received when the value C of the internal counter is 3, then a numeric value of the weight is 2, and therefore the incoming call tone melody E having the program number "3" is continuously used until the second reception on and after that reception of the incoming call.

In order to realize such a weighting method, for example, a sub-counter is provided in addition to the internal counter. An initial value of the sub-counter is set to zero, and in this state, the control circuit 101, at the time when the value C of the internal counter becomes 2, sets the value of the sub-counter to 1, and after then, increments the value of the sub-counter by +1 at every reception of an incoming call. Thus, after the first reception, the value of the sub-counter becomes 2, and after the second reception, the value of the sub-counter becomes 3. After the output of the incoming call tone melody D is ended, the control circuit 101 needs to repeat the same melody D corresponding to the program number 2 as the value C of the internal counter unless the value of the sub-counter exceeds 3 which is set as a numeric value of the weight. In order to attain this, whenever the incoming call tone melody is outputted, the value C of the internal counter is decreased to −1 so that the value C of the internal counter is constantly returned back to 2. When the third reception occurs, the value of the sub-counter becomes 4 and hence exceeds 3 set as the numeric value of the weight. Hence, the value of the sub-counter is returned back to the initial value 0 while the value C of the internal counter is held as it is.

When next reception of an incoming call occurs, the internal counter is incremented to 3, and as a result, the melody E corresponding to the next program number 3 is selected.

Essentially, the control circuit 101 selects one incoming call tone data among a plurality of kinds of incoming call tone data whenever the internal counter is incremented in accordance with predetermined order of the program numbers corresponding to the respective values C of the internal counter. In the fifth embodiment, during the selection of the incoming call tone data, the incoming call tone data having a large numeric value of the weight can be selected in higher frequency than that of other incoming call tone data. Thus, according to the fifth embodiment, if there is reception of incoming calls corresponding to the predetermined number of times, then a plurality of incoming call tone melodies which a user likes are used without omission, and also a specific incoming call tone melody which a user likes more is used more frequently.

Next, a sixth embodiment will hereinafter be described.

In the sixth embodiment, the control circuit 101 has the following functions. The other parties for communication are ranked in the order of number of times of outgoing a call on the basis of the history of outgoing a call to telephone numbers or E-mail addresses stored in the memory 102. Then, upon reception of an incoming call, an incoming call tone is specified in accordance with the ranks of the other parties for communication corresponding to the order of number of times of outgoing a call. More specifically, the control circuit 101 retrieves the history of outgoing a call for a predetermined period of time to telephone numbers or E-mail addresses stored in the memory 102 to rank the other parties for communication in the order of number of times of outgoing a call. Then, upon reception of an incoming call, when the other party for communication is the first rank, the melody corresponding to the program number "1" is outputted. When the other party for communication is the second rank, the melody corresponding to the program number "2" is outputted. Also, when the rank of the other party for communication is larger than the maximum value Cmax of the program number, the incoming call tone corresponding to the program number Cmax is outputted.

According to the sixth embodiment, it is possible to change the incoming call tone in reception of an incoming call from the other party to whom a user transmits a voice call or E-mail call more frequently, and from the other party to whom a user does not transmit a voice call or E-mail call so frequently.

Next, a seventh embodiment will hereinafter be described.

In the seventh embodiment, the control circuit 101 has the following functions. The seventh embodiment differs from the sixth embodiment in the point that the other parties for communication are ranked in the order of number of times of reception of incoming calls on the basis of the history of call reception from telephone numbers or E-mail addresses stored in the memory 102. Moreover, upon reception of an incoming call, an incoming call tone is specified in accordance with the ranks of the other parties for communication corresponding to the order of number of times of reception of incoming calls. More specifically, the control circuit 101 retrieves the history of call reception for a predetermined period of time to telephone numbers or E-mail addresses stored in the memory 102 to rank the other parties for communication in the order of number of times of reception of incoming calls. Then, upon reception of an incoming call, when the other party for communication is the first rank, the melody corresponding to the program number "1" is outputted. When the other party for communication is the second rank, the melody corresponding to the program number "2" is outputted. Also, when the rank of the other party for communication is larger than the maximum value Cmax of the program number, the incoming call tone corresponding to the program number Cmax is outputted.

According to the seventh embodiment, it is possible to change the incoming call tone in reception of an incoming call from the other party from whom a user receives an incoming voice call or E-mail call more frequently, and from the other party from whom a user does not receive a voice call or E-mail call so frequently.

As set forth hereinabove, according to the present invention, the cellular phone, whenever receiving an incoming call, selects one incoming call tone data among a plurality of kinds of incoming call tone data in accordance with the predetermined order to output the incoming call tone melody based on the selected incoming call tone data. Consequently, a user can exhaustively use a plurality of incoming call tone melodies which a user likes without carrying out such a troublesome operation as to change the incoming call tone melody at every reception of an incoming call.

In addition, according to the present invention, a user can set the melody as the incoming call tone for informing the user of reception of an incoming call in correspondence to the number of times of reception of an incoming call. Consequently, a user can exhaustively use a plurality of melodies which a user likes as a incoming call tone without carrying out such a trouble some operation as to change the incoming call tone melody at every reception of incoming call. Also, a plurality of melodies are used as the incoming call tone melodies in the order which a user sets. Consequently, there is offered an effect that a user hardly gets tired of hearing the incoming call tone melodies as compared with a case where only a single melody is used as an incoming call or E-mail tone melody.

What is claimed is:

1. An incoming call reception informing method for a cellular phone including a function of generating, when an incoming call is received, an incoming call tone to inform a user of reception of the incoming call, the method comprising:

storing incoming call tone data from which a plurality of kinds of incoming call tones are obtained, respectively;

specifying, whenever said incoming call is received, the incoming call tone data of which rank in predetermined order is used;

providing a table in which information used to specify a kind of said incoming call tone data is set in correspondence to information indicating order of said incoming call tone data;

setting set information indicating whether or not selection of the incoming call tone data based on said table is carried out;

selecting the incoming call tone data based on the contents of said table, or selecting, when said set information indicates the selection of the incoming call tone data based on said table is not carried out, an incoming call tone data specified in advance; and reading out the specified incoming call tone data to output an incoming call tone.

2. An incoming call reception informing method for a cellular phone including a function of generating, when an incoming call is received, an incoming call tone to inform a user of reception of the incoming call, the method comprising:

storing incoming call tone data from which a plurality of kinds of incoming call tones are obtained, respectively;

specifying, whenever said incoming call is received, the incoming call tone data of which rank in predetermined order is used;

providing a table in which information used to specify a kind of said incoming call tone data is set in correspondence to information indicating order of said incoming call tone data;

providing said table with a table used when a voice call is received, and a table used when an E-mail call is received;

using said table in correspondence to a kind of incoming call; and reading out the specified incoming call tone data to output an incoming call tone.

3. An incoming call reception informing method for a cellular phone, comprising:

an incoming call reception monitoring step of monitoring whether or not a voice call is received in a stand-by state;

a program melody selection step of, when the voice call is detected, verifying whether or not setting is made in which incoming call tone output is carried out using program melody selection information, and when the setting is made in which incoming call tone output is carried out using said program melody selection information, adding the value of 1 to a value C of an internal counter stored in a memory;

an internal counter judgment step of comparing said value C of said internal computer with a maximum value Cmax of a program number, and when a relationship of C>Cmax is established, setting said value C of the internal counter to 1;

an incoming call tone specification step of retrieving said program melody selection information stored in said memory and recognizing the program number having the same value as said value C of the internal counter to specify an incoming call tone melody corresponding to the recognized program number;

a first incoming call tone output step of reading out the data of said specified incoming call tone melody from said memory and converting the read-out data into an incoming call tone to output the resultant incoming call tone; and a second incoming call tone output step of, when the setting is not made in which incoming call tone output is carried out using said program melody selection information, reading out the data of the pre-specified incoming call tone from said memory and converting the read-out data into an incoming call tone to output the resultant incoming call tone.

4. An incoming call reception informing method for a cellular phone according to claim 3, further comprising:

ranking other parties for communication in the order of number of times of outgoing a call based on history of said outgoing a call to telephone numbers stored in said memory; and specifying, when an incoming call is received, the incoming call tone in correspondence to the ranks of said other parties for communication corresponding to the order of number of times of said outgoing a call.

5. An incoming call reception informing method for a cellular phone according to claim 3, further comprising:

ranking other parties for communication in the order of number of times of reception of incoming calls based on history of incoming calls from telephone numbers stored in said memory.

6. An incoming call reception informing method for a cellular phone, comprising:

an incoming call reception monitoring step of monitoring whether or not an incoming E-mail call is received in a stand-by state;

a program melody selection step of, when reception of said incoming E-mail call is detected, verifying whether or not setting is made in which incoming call tone output is carried out using program melody selection information, and when the setting is made in which the incoming call tone output is carried out using said program melody selection information, adding the value of 1 to a value C of an internal counter stored in a memory;

an internal counter judgment step of comparing said value C of the internal computer with a maximum value Cmax of a program number, and when a relationship of C>Cmax is established, setting said value C of the internal counter to 1;

an incoming call tone specification step of retrieving said program melody selection information stored in said memory and recognizing the program number having the same value as said value C of the internal counter to specify an incoming call tone melody corresponding to the recognized program number;

a first incoming call tone output step of reading out the data of the specified incoming call tone melody from said memory, converting the read-out data into an incoming call tone to output the resultant incoming call tone, and starting a timer to operate;

a second incoming call tone output step of, when the setting is not made in which incoming call tone output is carried out using said program melody selection information, reading out the data of the pre-specified incoming call tone from said memory, converting the read-out data into an incoming call tone to output the resultant incoming call data, and starting said timer to operate; and an incoming call tone stops step of, when time measurement with said timer is ended, stopping the incoming call tone output.

7. An incoming call reception informing method for a cellular phone according to claim 6, further comprising:

ranking other parties for communication in the order of number of times of outgoing a call based on history of said outgoing a call to E-mail addresses stored in said memory; and specifying, when an incoming call is received, the incoming call tone in correspondence to the ranks of the other parties for communication corresponding to the order of number of times of said outgoing a call.

8. An incoming call reception informing method for a cellular phone according to claim 6, further comprising:

ranking other parties for communication in the order of number of times of reception of incoming calls based on history of incoming calls from E-mail addresses stored in said memory.

9. A cellular phone including a function of generating, when an incoming call is received, an incoming call tone to inform a user of reception of the incoming call, comprising:

a memory for storing therein a plurality of kinds of incoming call tone data wherein said memory includes an information table in which melody names corresponding to the incoming call tone data, melody registration numbers as serial numbers given in registration order, and program numbers indicating order of output of corresponding incoming call tone melodies are set in correspondence to each other; and a control circuit for selecting, whenever an incoming call is received, one incoming call tone data among a plurality of kinds of incoming call tone data stored in the memory in accordance with predetermined order, wherein said control circuit automatically specifies a number indicating order of output of incoming call tone melodies corresponding to said incoming call tone data.

10. A cellular phone including a function of generating, when an incoming call is received, an incoming call tone to inform a user of reception of the incoming call, comprising:

a memory for storing therein a plurality of kinds of incoming call tone data; and a control circuit for selecting, whenever an incoming call is received, one incoming call tone data among a plurality of kinds of incoming call tone data stored in the memory in accordance with predetermined order;

wherein said memory has an information table in which melody names corresponding to said incoming call tone data, melody registration numbers as serial numbers given in registration order, program numbers indicating order of output of corresponding incoming call tone melodies, and weight indicating how many times the same incoming call tone melody is continuously used for each reception of an incoming call are set in correspondence to one another.

* * * * *